United States Patent
Kawasaki et al.

(10) Patent No.: US 7,634,943 B2
(45) Date of Patent: Dec. 22, 2009

(54) SHEET MATERIAL INFORMATION ACQUIRING DEVICE AND SHEET MATERIAL PROCESSING APPARATUS INCLUDING SAME

(75) Inventors: Takehiko Kawasaki, Kamakura (JP); Norio Kaneko, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 40 days.

(21) Appl. No.: 11/951,854

(22) Filed: Dec. 6, 2007

(65) Prior Publication Data
US 2008/0150226 A1 Jun. 26, 2008

(30) Foreign Application Priority Data
Dec. 20, 2006 (JP) .............................. 2006-343053

(51) Int. Cl.
*G01L 5/04* (2006.01)
(52) U.S. Cl. ........................................................ 73/159
(58) Field of Classification Search .................... 73/159
See application file for complete search history.

(56) References Cited

U.S. PATENT DOCUMENTS

| 4,135,393 | A | * | 1/1979 | Jordan ...................... 73/862.46 |
| 4,201,093 | A | * | 5/1980 | Logan ........................... 73/618 |
| 5,934,140 | A | | 8/1999 | Jackson et al. |
| 6,097,497 | A | * | 8/2000 | McGraw ..................... 358/1.12 |
| 7,152,861 | B2 | | 12/2006 | Kawasaki .................... 271/262 |
| 7,239,817 | B2 | | 7/2007 | Kaneko et al. ................. 399/45 |
| 7,296,795 | B2 | | 11/2007 | Kawasaki .................... 271/262 |
| 7,304,291 | B2 | | 12/2007 | Kawasaki et al. ............ 250/221 |
| 7,334,342 | B1 | * | 2/2008 | Barr et al. ....................... 33/528 |
| 7,451,982 | B2 | * | 11/2008 | Kawasaki et al. ...... 271/265.04 |
| 7,458,576 | B2 | * | 12/2008 | Kawasaki et al. ...... 271/265.04 |
| 2006/0022400 | A1 | | 2/2006 | Kawasaki et al. ............ 271/227 |
| 2006/0275045 | A1 | | 12/2006 | Kawasaki et al. ............. 399/45 |
| 2007/0036567 | A1 | | 2/2007 | Kawasaki et al. ............. 399/45 |
| 2008/0001348 | A1 | | 1/2008 | Kawasaki et al. ............ 271/259 |

FOREIGN PATENT DOCUMENTS

| JP | 10-152245 | 6/1998 |
| JP | 2002-68528 | 3/2002 |

* cited by examiner

*Primary Examiner*—Lisa M Caputo
*Assistant Examiner*—Octavia Davis
(74) *Attorney, Agent, or Firm*—Fitzpatrick, Cella, Harper & Scinto

(57) ABSTRACT

A sheet member information acquiring device has a load-applying member configured to come into contact with the sheet member and to apply a load to the sheet member, a rotation bearing configured to hold the load-applying member rotatably around at least a rotation axis, a protrusion provided at the end portion of the load-applying member that contacts the sheet member, the protrusion being located at a position offset by a predetermined distance from the rotation axis, a changing portion configured to change relative positions of the sheet member and load-applying member while in a contact state, and a detecting portion configured to detect a displacement of the load-applying member. The device acquires the information of the sheet member on the basis of information provided by the detecting portion.

6 Claims, 5 Drawing Sheets

SHEET MATERIAL INFORMATION ACQUIRING DEVICE AND SHEET MATERIAL PROCESSING APPARATUS INCLUDING SAME

BACKGROUND OF THE INVENTION

1. Field of the Invention

The present invention relates to a sheet member information acquiring device that acquires information relating to the properties of a sheet member such as a recording medium for image formation. The present invention also relates to a sheet member processing apparatus that controls processing of the sheet member on the basis of the information relating to the properties of the sheet member.

2. Description of the Related Art

Demands for an increase in the quality of an image, an increase in the speed of processing, and the like, are growing for a sheet member processing apparatus like an image forming apparatus (for example, a laser beam printer, a copier, or an inkjet printer). Also, various types of sheet members such as paper are used depending on the choice of a user of the apparatus, or the operation environment. The sheet member processing apparatus has to correspond to these sheet members.

It is known to control a sheet member processing apparatus for image formation or the like by determining the presence, type, and characteristic of the sheet member, such as paper, being processed. For example, Japanese Patent Laid-Open No. 10-152245 discloses a configuration having a reflective optical sensor composed of a light-emitting portion and a light-detecting portion, and a determining portion that compares the quantity of detected light with a reference value and determines the presence and type of a sheet member (recording medium). Also, Japanese Patent Laid-Open No. 2002-68528 discloses a configuration having a light source and a position detector to detect a displacement of a member that comes into contact with a sheet member to be conveyed.

However, to better control sheet member processing, it is necessary to determine the mechanical characteristics and surface roughness of the sheet member. In particular, sheet members such as paper may have anisotropy depending on the fiber orientation of the sheet member. To control the sheet member processing, details of the characteristic information involving the anisotropy is necessary. The above-mentioned related arts, however, only provide insufficient information.

SUMMARY OF THE INVENTION

The present invention provides a sheet member information acquiring device capable of acquiring sheet member information such as mechanical characteristics and surface irregularity, and anisotropy of the characteristic information, for properly controlling a sheet member processing apparatus. Also, the present invention provides a sheet member processing apparatus capable of controlling processing steps on the basis of the sheet member information.

According to an aspect of the present invention, sheet member information acquiring device is configured to acquire information about a sheet member and output the information. The device comprises a load-applying member configured to apply a load to the sheet member, and a rotation bearing configured to hold a load-applying member rotatably around at least a rotation axis, wherein the load-applying member has a protrusion provided at an end portion of the load-applying member subjected to contact with the sheet member, the protrusion being located at a position offset by a predetermined distance from the rotation axis. A changing portion is configured to change relative positions of the sheet member and a load-applying member while in a contact state and a detecting portion is configured to detect a displacement of the load-applying member. The sheet member information acquiring device acquires the information about the sheet member on the basis of information provided by the detecting portion.

A sheet member processing apparatus according to a second aspect of the present invention includes the sheet member information acquiring device of the first aspect. The apparatus determines a sheet member processing condition on the basis of the sheet member information provided by the sheet member information acquiring device.

With the first aspect of the present invention, the sheet member information acquiring device can be provided that is capable of acquiring the sheet member information containing at least the characteristic information of the mechanical characteristic and the surface irregularity, and the anisotropy of the characteristic information, for properly controlling the sheet member processing apparatus. Also, with the second aspect of the present invention, the sheet member processing apparatus can be provided that is capable of properly controlling the processing steps on the basis of the sheet member information.

Further features of the present invention will become apparent from the following description of exemplary embodiments with reference to the attached drawings.

DESCRIPTION OF THE EMBODIMENTS

First, a sheet member information acquiring device according to an embodiment of the present invention is described below.

In this embodiment, a sheet member may be a sheet-like image-recording medium, such as a piece of paper (normal paper, glossy paper, coated paper, recycled paper, etc.), a film or an overhead transparency (OHT) sheet made of resin etc. The sheet member may be provided in any form, such as in the form of a cut sheet with a predetermined size (cut paper), or a rolled sheet (rolled paper). The sheet member may be composed of a single layer or may contain two or more bonded layers. In this specification, unless otherwise noted, the sheet member is described as a cut sheet with a predetermined size.

In the embodiment of the present invention, sheet member information consists of information relating to a sheet member, the pieces which are necessary for sheet member processing. Particularly important pieces of information are the physical property and shape of the sheet member, and information relating thereto. For example, such information may include the thickness, density, modulus of elasticity, stiffness, vibrational characteristic, irregularity, surface roughness, deformed state, strength, ease of elastic deformation and plastic deformation, and elongation, of the sheet member. Further, the deformation (stretching, flexing, crushing, breaking, folding, and the like), transmittance, state of curl, etc., of the sheet member may also be included in the information relating to a sheet member. In a case where the sheet member is a piece of paper, the information may also include unevenness of the fiber, basis weight, and coating layer, of the sheet member. Other pieces of information important for the sheet member information may be information about substance embedded in the sheet member, the substance possibly affecting the physical property of the sheet member. The embedded substance may be an element such as an ID tag, or a natural object such as a pressed flower or a leaf. In addition, information about a previously formed image, adhesion of a foreign substance, dirt, the size and shape of a medium, bending of a corner part, the state of processing such as cutting or punching, lamination, coating, attachment of a staple, and the like, may be contained in the sheet member information. Moreover, whether surfaces of a plurality of media (sheet members) are bonded together, or whether two or more media completely or partially overlap, are also important information.

In the present embodiment of the invention, sheet member information containing at least the characteristic information of the mechanical characteristic and the surface irregularity, and the anisotropy of the characteristic information, is acquired, so as to multilaterally acquire the sheet member information necessary for the sheet member processing.

A sheet member information acquiring device according to an embodiment of the present invention includes a load-applying member configured to come into contact with a sheet member and apply a load to the sheet member, and a rotation bearing configured to hold the load-applying member rotatably around at least a rotation axis. Also, the device has a protrusion provided at a portion of the load-applying member subjected to contact with the sheet member, the protrusion being located at a position offset by a predetermined distance from the rotation axis, and a changing portion configured to change (or shift) relative positions of the sheet member and load-applying member while in a contact state. Further, the device includes a detecting portion configured to detect a displacement of the load-applying member, so as to acquire information of the sheet member on the basis of information provided by the detecting portion. In particular, the load-applying member that comes into contact with the sheet member while applying a load to the sheet member receives a rotation force from the sheet member during conveyance. The protrusion rubs the sheet member and is displaced while applying the load to the sheet member. Hence, information of the displacement is acquired. In the embodiment of the present invention, shifts in relative positions of the sheet member and load-applying member due to the conveyance are referred to as changes (or shifts) in the relative positions. In this case, a conveying portion for the sheet member may serve as the changing portion of the relative positions.

Main components of the sheet member information acquiring device according to the embodiment of the present invention are described below with desirable examples.

(1) Load-Applying Member and Protrusion

To apply a load, a load-applying member having a given mass is brought into contact with a sheet member while applying a predetermined load to the sheet member. Alternately, a load-applying member having a given mass is driven into a sheet member at a predetermined speed and a predetermined acceleration.

The material, shape, load, mass, collision speed, and acceleration of the load-applying member are determined in accordance with the type of sheet member to be detected and a range of detection. For example, the sheet member, which is used for a copier, and is suitable for the detection, may be normal paper, coated paper, bond paper, recycled paper, or a resin sheet such as OHT sheet.

The material and shape of the load-applying member may be selected so that wear of the load-applying member due to the collision and contact with the sheet member, plastic deformation, and elastic deformation, are minimized, the toughness is large, and a crack is prevented from occurring. In particular, the material may be a metal material such as stainless steel, and the shape may be a sphere, or a bar having a curved surface at a tip end portion thereof which collides with the sheet member. Employing the curved surface allows a load to be stably applied to the sheet member even when an angle of collision varies due to vibration of the load-applying member or sheet member during the collision. Accordingly, local wear can be reduced and overall wear made more uniform. The curved surface may partially have a flat portion. If the flat portion collides with the sheet member, the sheet member will be compressed evenly at the point of collision, and errors caused by the unevenness of the sheet member can be reduced.

In the embodiment of the present invention, the protrusion is provided at the portion of the load-applying member subjected to contact with the sheet member, the protrusion being located at a position offset by a predetermined distance from the rotation axis. The protrusion is provided by processing the tip end portion that contacts the sheet member, so as to have an asymmetric shape with respect to the rotation axis. This will be described in detailed embodiments.

The load, mass, collision speed, and acceleration of the load-applying member are determined in accordance with the stiffness of the sheet member, within ranges that prevent an indentation and the like from being made on the sheet member by the load-applying member. For example, ranges desirable for the detection of the sheet member used for the copier or the like can be defined such that the range of the load is from about 1 to 100 gf, the range of the mass is from about 1 to 10 g, and the range of the collision speed is from about 0.1 to 1 m/sec. It is desirable that the acceleration during the collision be as small as possible. Accordingly, the collision can be performed at a stable speed even though the displacement of the load-applying member prior to the collision varies due to the unevenness of the thickness of the sheet member or to the fixing accuracy of the sheet member information acquiring device. A desirable range of the acceleration per displacement of 1 mm is such that a variation in speed is 5% or less, and more particularly, 1% or less, although the values may rely upon the collision speed. To reduce the acceleration, an acceleration provided by an acceleration unit, an acceleration or a deceleration caused by the gravity, and a deceleration caused by a resistance like a friction, are combined for cancellation of the acceleration.

The load may be applied every time when the information is acquired, or a plurality of times. Also, the load may be applied to a plurality of positions at the same time, or at different timings. When the load is applied a plurality of times, external forces of a uniform value are desirably applied so as to equalize the output value, and hence, increase the accuracy. Alternatively, external forces of different values may be applied to detect a plurality of physical properties of the sheet member.

In addition, mechanisms that bend and compress the sheet member utilizing the load application can be provided. The mechanism that bends the sheet member may have a step structure such as a groove structure (recessed structure) located at a position opposing the load-applying member with the sheet member interposed therebetween. The mechanism that compresses the sheet member may have a receiving member located at a position opposing the load-applying member with the sheet member interposed therebetween, so as to receive an external force through the sheet member. Such a groove structure or a receiving member may be integrally formed or separately provided. The sheet member can be bent with a side or both sides of the sheet member supported during bending. Alternatively, the sheet member can be bent in a manner that a part of the sheet surface is recessed. For example, an external force detecting mechanism may be directly bonded to the load-applying member so as to detect a repulsive force of the sheet member. In such a case, the receiving member does not have to be provided.

(2) Rotation Bearing

The rotation bearing rotatably supports the load-applying member. Supporting only provides a minimum influence against the load application. An exemplary method of rotatably supporting the load-applying member is to support the load-applying member in a rotatable manner by itself. Another exemplary method is to provide the load-applying member at a second end of an arm, while a first end thereof is supported by the rotation bearing, and to support the load-applying member in a rotatable manner around the rotation bearing.

The rotation bearing of the embodiment may have a given load in a rotation direction. A given friction resistance may be applied in the rotation direction of the bearing. In particular, a spring deformable along with the rotation of the axis may be provided so as to control the load to a suitable value. The spring may be an extendable coil spring, or a torsion spring deformable in a torsion direction because of the rotation of the axis. Or, these springs may be used in combination.

(3) Detecting Portion

In the embodiment, the detecting portion detects a displacement of the load-applying member. The displacement of the load-applying member contains a displacement of the load-applying member, and a displacement of a component which is deformed or displaced due to the load applied from the load-applying member. The displacement can be detected by measuring the position, speed, acceleration, and force of the load-applying member.

For example, the detecting portion has an acceleration sensor bonded to the load-applying member. Alternatively, the detecting portion may have a pressure sensitive element that detects an action applied by the load-applying member to the sheet member because of the displacement of the load-applying member through the sheet member. Still alternatively, the detecting portion may have a displacement measuring unit configured to detect the displacement of the load-applying member.

The pressure sensitive element and acceleration sensor may employ an element capable of detecting pressure or acceleration, such as a piezoelectric element, a piezoresistance element, a capacitive acceleration sensor or a magnetic sensor. The pressure sensitive element desirably performs detection while directly coming into contact with the sheet member. However, the element may also perform detection through a medium such as air.

The displacement measuring unit may be an optical unit configured to detect a reflection direction and a transmission amount of light emitted from a light source. Alternatively, the position or speed of a predetermined portion of the sheet member to be deformed by the load-applying member may be detected. More particularly, a unit may be used that is configured to measure a temporal shift (vibration) and a spatial shift (deformation).

In this embodiment, the displacement of the load-applying member to be detected involves a displacement in all directions. In particular, the displacement may involve vibration caused by the irregularity of the sheet member, rotation, bounce due to a repulsive force, and absorption of sinking into the sheet member.

(4) Changing Portion (Conveying Portion)

The changing portion (conveying portion) of this embodiment is a unit configured to shift the relative positions of the sheet member and the load-applying member in contact state. Either or both of the sheet member and the load-applying member may be moved. For example, the changing portion may be a unit configured to convey the sheet member in a predetermined direction with rollers.

(5) Other Components

In addition to the above-mentioned main components, a driving unit configured to apply a load or a displacement to the load-applying member, a supporting portion configured to support the sheet member, a control circuit, and the like, are arranged.

Next, a sheet member processing apparatus according to an embodiment of the present invention is described below.

The sheet member processing apparatus in this embodiment, for example, records a character or an image on a sheet member. Examples of the sheet member processing apparatus may be a copier, a laser beam printer, and an inkjet printer, which are popular image-forming apparatuses, and usually perform correction of curl, stacking, sorting for book binding, punching, stapling, etc., as one of procedures. All procedures from when a medium is set in the image-forming apparatus until when the medium is ejected from the image-forming apparatus are the subjects of processing. Another example of sheet member processing in this embodiment is to read the content recorded on the sheet member. The content recorded on the sheet member may be an image, a character, a stamp, data magnetically recorded, and data recorded in an embedded element. The content may be in any type and any form.

The sheet member processing apparatus of this embodiment may be an apparatus (for example, document scanner) that conveys a sheet member and reads information recorded on the sheet member, an apparatus that feeds paper money or tickets, an apparatus that processes a sheet member by folding or punching.

The sheet member processing apparatus of this embodiment changes, adjusts, or controls the processing condition of a sheet member on the basis of the sheet member information acquired with the sheet member information acquiring device. The processing condition may be an image-forming condition associated with the transfer of a colorant on a medium. The colorant may be a toner for an electrophotograph or an ink for an inkjet printer. The image-forming condition is adjusted by changing the image-forming condition in accordance with the sheet member information, or by changing the control condition for image formation. For example, an image is formed in thin-sheet mode for a thin sheet member, whereas an image is formed in thick-sheet mode for a sheet member with a large thickness. The image-forming condition to be controlled may include adjustment of a transfer amount of a colorant. The transfer amount of the colorant is, for example, a supplying amount of a toner, or an adhering amount of an ink, to a medium. In addition, the image-forming condition may include adjustment of a fixing condition of the colorant. The fixing condition is, for example, a fixing temperature or a fixing pressure.

The sheet member processing condition is not limited to the adjustment of the location of the image, or the transfer condition of the colorant.

The sheet member processing condition is determined with a processor that processes input data and determines the operation of the sheet member processing apparatus. The processor may be arranged in the apparatus of this embodiment, or an external computer or the like may serve as the processor.

The sheet member processing apparatus of this embodiment processes a sheet member under the sheet member processing condition determined as described above.

First Embodiment

A sheet member information acquiring device according to a first exemplary embodiment of the present invention is described.

Figure 1:
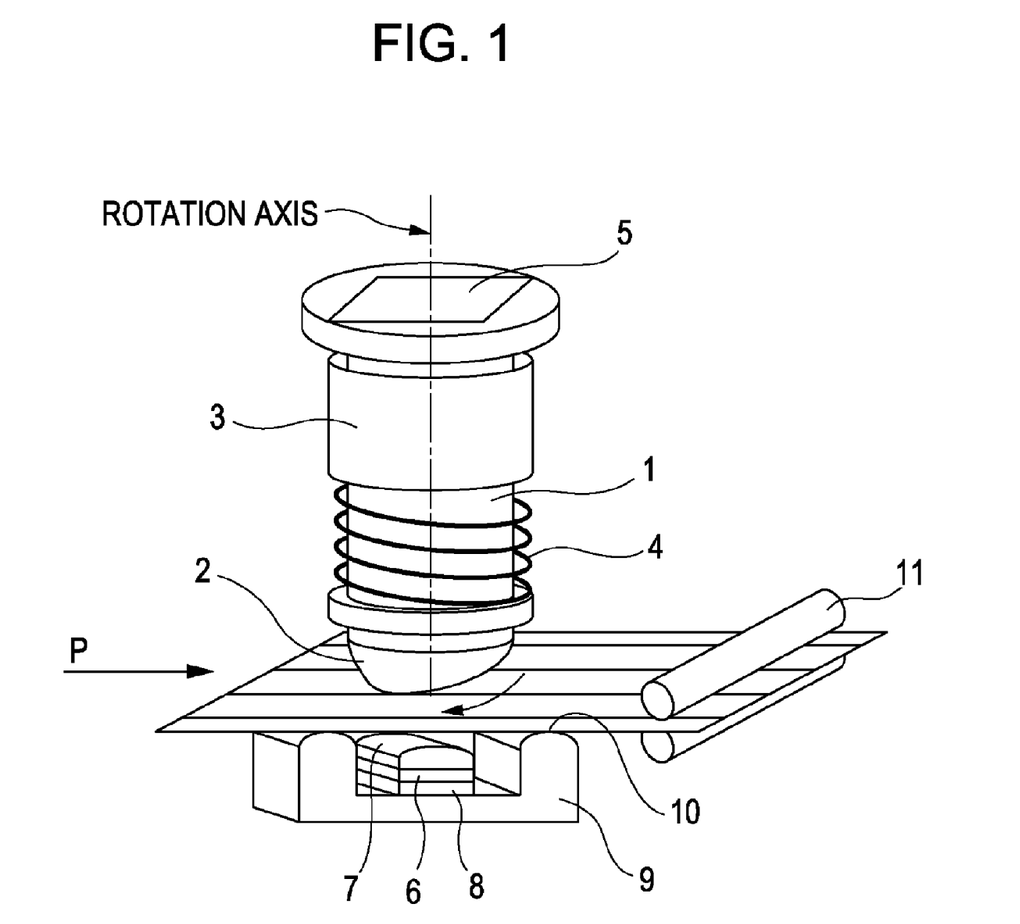
FIG. 1 is an illustration showing a configuration of a sheet member information acquiring device according to an embodiment of the present invention.

FIG. 1 is an illustration showing a configuration of a sheet member information acquiring device according to this embodiment.

Components shown in FIG. 1 are described. A load-applying member 1 has a protrusion 2 disposed in a tip end portion of the load-applying member 1 at a position offset by a predetermined distance from the rotation axis. The load-applying member 1 is supported by a rotation bearing 3 in a manner rotatable around the rotation axis. The load-applying member 1 applies a predetermined load to a sheet member P with a coil spring 4 as a driving unit configured to apply the load. Though not shown, the rotation bearing 3 is fixed to a housing so as to maintain constant the distance between the sheet member P and the rotation bearing 3. The coil spring 4 is compressed, and both ends thereof are fixed at the rotation bearing 3 and the load-applying member 1 so as not to disturb the rotation. The coil spring 4 supplies a load to the load-applying member 1. A detecting portion 5 is connected to the load-applying member 1. A receiving member 7 configured to receive the load applied to the sheet member is provided at a position opposing the load-applying member 1 with the sheet member P interposed therebetween. The receiving member 7 optionally has a pressure sensitive element 6. The pressure sensitive element 6 serves as a second detecting portion. The pressure sensitive element 6 and the receiving member 7 are fixed to a mount 9 with a cushioning 8 interposed therebetween. The mount 9 has a supporting portion 10 configured to support the sheet member P. A conveying portion 11 is provided as the changing portion to move relative positions of the sheet member P and load-applying member 1 in contact state. Also, there is optionally provided a unit configured to control the load-applying member 1 to be in contact state or non-contact state with respect to the sheet member P.

Figure 2:
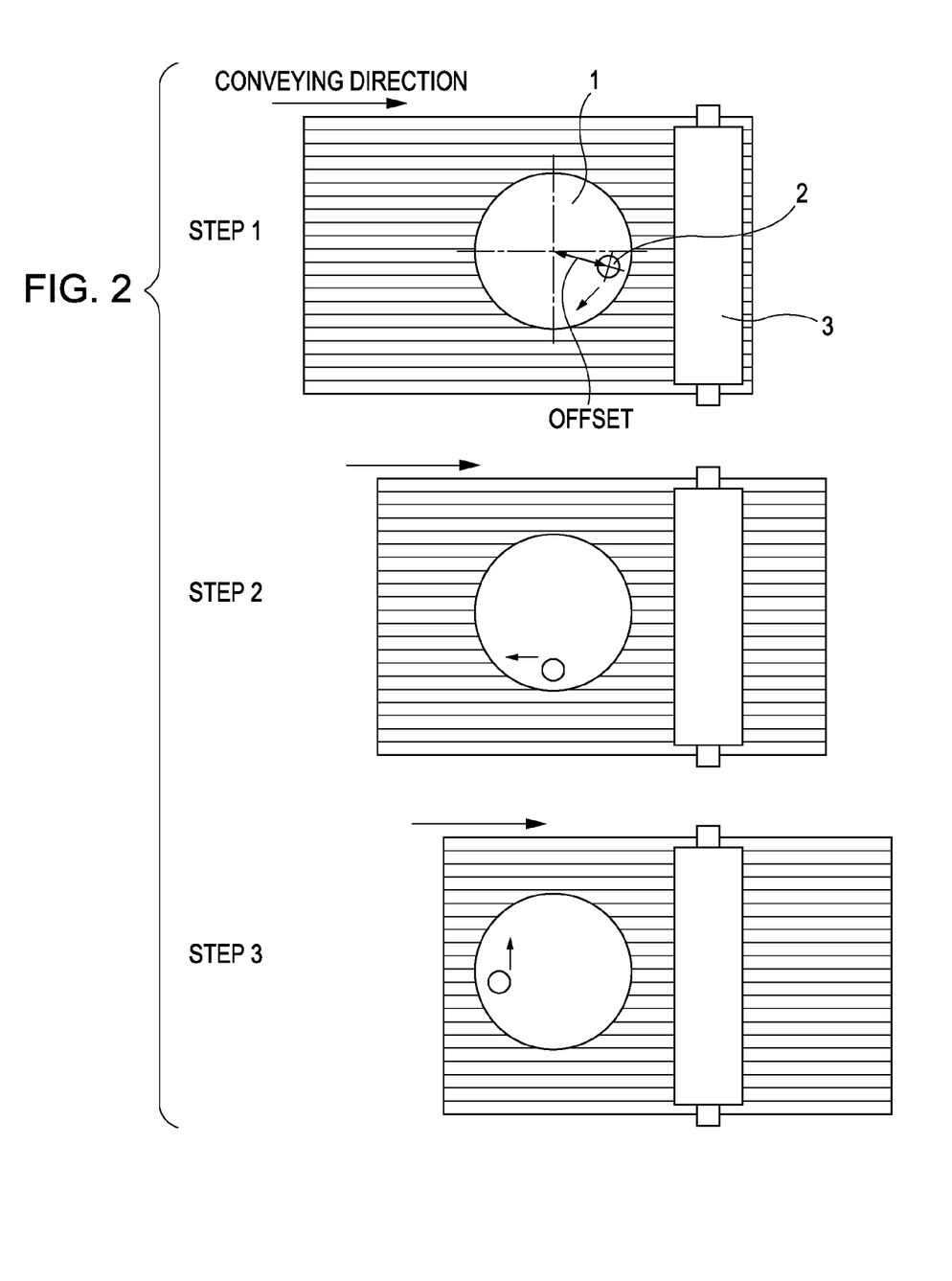
FIG. 2 is an illustration showing the overview of the operation of the sheet member information acquiring device according to the embodiment of the present invention.

The overview of an operation of the sheet member information acquiring device according to this embodiment is described. FIG. 2 schematically shows movement of the load-applying member, the protrusion, and the sheet member during this operation. In FIG. 2, as the sheet is conveyed, steps 1 to 3 are performed in sequence. The protrusion 2 is located at a position offset by a predetermined distance from the rotation axis of the load-applying member 1 (indicated by dotted-chain lines in the drawing). In step 1, an initial position of the load-applying member 1 is determined, and the conveyance of the sheet member is started. The initial position is determined such that a line connecting the rotation axis of the load-applying member 1 and the center of the protrusion 2 is deviated from a conveying direction of the sheet member by a predetermined angle. The initial position allows the operation to be started smoothly. The protrusion 2 being in contact with the sheet member P is moved because of a conveying force in a rotation direction (clockwise in the drawing), and hence, the load-applying member 1 is moved. The sheet member information is transmitted to the protrusion 2 in contact state in this step. As indicated by an arrow inside the circle in the drawing, sheet member information acquired by scanning the sheet member P in a direction substantially perpendicular to the conveying direction of the sheet member P can be acquired in step 1. As step 1 shifts to step 2, the relative angle between the protrusion 2 and the sheet member P is shifted due to the movement of the protrusion 2, and sheet member information acquired by scanning the sheet member P in a direction substantially parallel to the conveying direction of the sheet member can be acquired in step 2. As step 2 shifts to step 3, sheet member information acquired by scanning the sheet member P in the direction substantially perpendicular to the conveying direction of the sheet member P can be acquired in step 3. Then, the protrusion 2 may be returned to the initial position, or the sheet member P may be brought away from the load-applying member 1, as desired.

An exemplary configuration of the sheet member information acquiring device in this embodiment is described more specifically.

First, the load-applying member 1 is described. The load-applying member 1 has a tip end portion (on the side subjected to contact with the sheet member P), and a shaft portion. The load-applying member 1 is made of a stainless material and has a columnar shape, and its center of the shaft is along a Z axis (rotation axis). A tip end surface of the tip end portion near the sheet member P is designed to be a spherical surface with a radius of 20 mm. It is assumed that the entire mass of the load-applying member 1 is 4 g. The load-applying member 1 is supported by the rotation bearing 3 such that the shaft portion of the load-applying member 1 can be linearly displaced in the axial direction, and the load-applying member 1 can be rotated. The rotation bearing 3 is made of a resin material with a small frictional resistance. In this embodiment, the rotation bearing 3 is made of fluoroplastics. The rotation axis of the load-applying member 1 is substantially aligned with a direction (Z-axis direction) orthogonal to the surface of the sheet member P.

The load-applying member 1 has the protrusion 2 at the tip end portion of the load-applying member 1. The protrusion 2 is integrally provided at the tip end surface of the load-applying member 1. The protrusion 2 is made of a material equivalent to that of the load-applying member 1, and has a spherical surface with a radius of 2 mm. The surface of the protrusion 2 is processed to have a surface roughness (also referred to as Ra) equivalent to that of the sheet member P so as to enhance an interaction with respect to the surface irregularity of the sheet member P to be detected. The protrusion 2 is located at a position offset by a predetermined distance from the rotation axis of the load-applying member 1 (indicated by dotted-chain lines in the drawing). In this embodiment, the offset distance is assumed as 8 mm.

A driving portion that drives the load-applying member 1 is defined by the coil spring 4 in this embodiment. The coil spring 4 has a predetermined compression force, and applies a load of 20 gf (gram force) to the sheet member P. Note that the load is a value in the resting state, and the load may vary depending on the interaction with respect to the sheet member P. Both ends of the coil spring 4 are fixed at the rotation bearing 3 and the load-applying member 1. The coil spring 4 serves as a torsion spring corresponding to the rotation of the load-applying member 1, and provides a given resistance.

Next, the detecting portion is described. The detecting portion 5 is bonded to the load-applying member 1 on the end opposite to the end that contacts the sheet member P. The detecting portion 5 is formed such that a piezoelectric element made of lead zirconate titanate (PZT) ceramic is bonded to a vibrating plate.

The receiving member 7 is configured to receive the load applied to the sheet member P and is provided at a position opposing the load-applying member 1 with the sheet member P interposed therebetween. The receiving member 7 optionally has a pressure sensitive element 6. The receiving member 7 is made of a stainless material, and uses the pressure sensitive element 6 similar to that of the detecting portion 5. If the characteristic, in particular, the frequency characteristic of the pressure sensitive element 6 is different from that of the detecting portion 5, then the pressure sensitive element 6 can detect a different characteristic of the sheet member P. The pressure sensitive element 6 and the receiving member 7 are fixed to the mount 9. The mount 9 has the supporting portion 10 configured to support the sheet member P.

In addition, a stepped structure can be provided between a surface of the supporting portion 10 of the mount 9 and a surface of the receiving member 7. With the stepped structure, the sheet member P is bent and displaced by a height of the step. Accordingly, a stiffness which is one of the sheet member characteristics can be included in an output signal. In particular, a displacement of the sheet member P due to vibration in its bending direction is transmitted to the load-applying member 1. Also, the mechanical characteristic such as the stiffness of the sheet member can be detected using the displacement.

The conveying portion 11 serves as the changing portion to change the relative positions of the sheet member P and the load-applying member 1 while in a contact state. In this embodiment, a mechanism configured to move the sheet member P is provided. In this embodiment, a pair of rubber rollers 11 nip the sheet member P. A motor (not shown) causes the rubber rollers 11 to rotate to convey the sheet member P in a predetermined conveying direction. Of course, the conveying portion may employ a sheet member conveying mechanism of the sheet member processing apparatus according to the embodiment of the invention.

Figure 4:
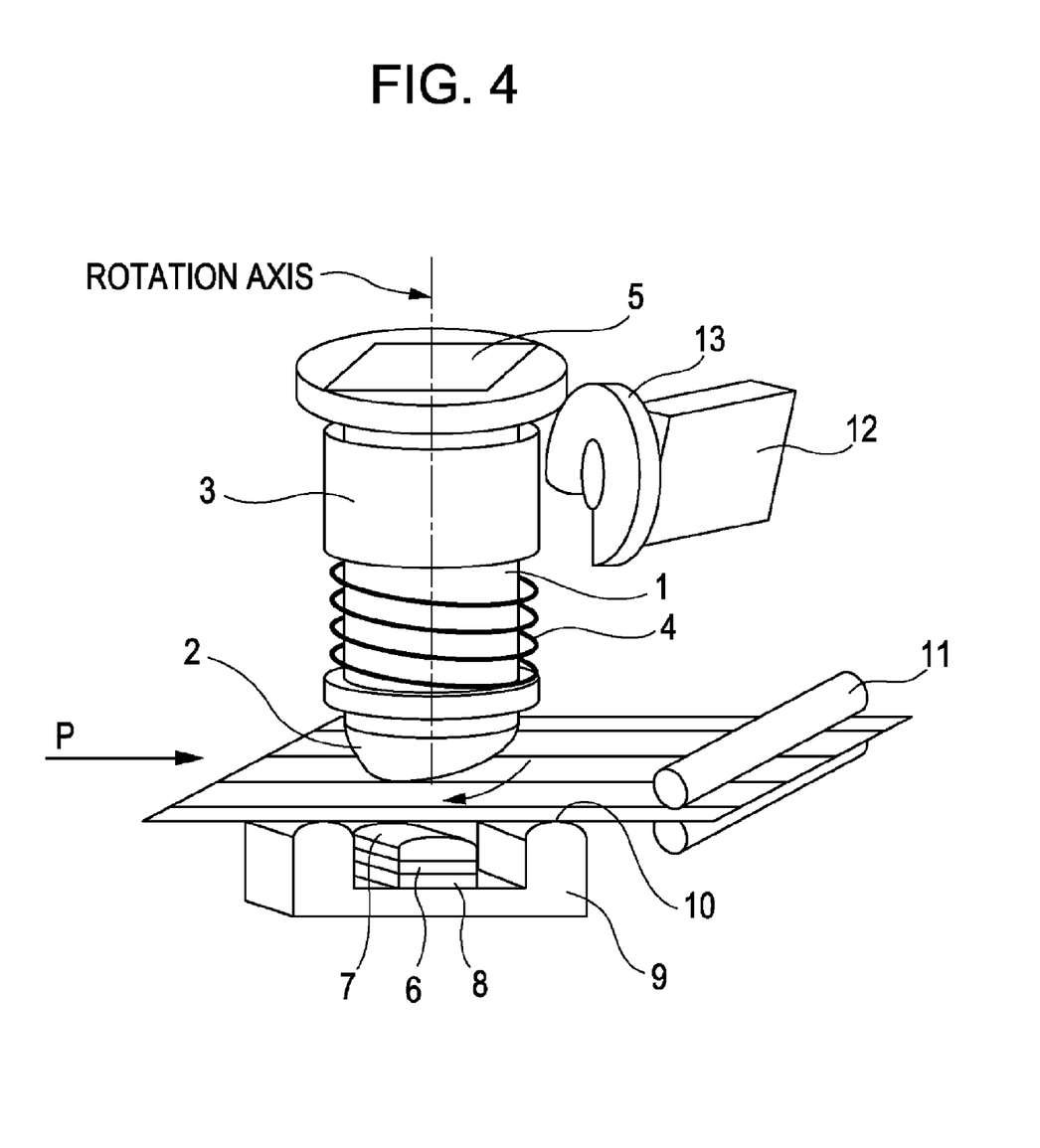
FIG. 4 is an illustration showing a configuration of a sheet member information acquiring device according to still another embodiment of the present invention.

Also, there is optionally provided a unit configured to control the load-applying member 1 to be in a contact state or a non-contact state with respect to the sheet member P. FIG. 4 shows a configuration with this unit. It is desirable that a distance between the load-applying member 1 and the sheet member P, the contact state, a range of the sheet member P to which a displacement is applied by bending or compressing, may be controlled. The load-applying member 1 may have a predetermined speed and collides with the sheet member P. Also, a contact period of time with the sheet member P may be controlled. The above-described controls can be easily performed with a unit configured to change the distance between the load-applying member 1 and the surface of the sheet member P using a motor 12 and a cam 13 as shown in FIG. 4.

The output signal of the device of this embodiment is analyzed as required, and the sheet member information is acquired. The analysis includes, for example, calculation of the peak, half-width, and integrated values of the output values, and frequency component analysis of the output waveform. In this embodiment, plural types of analyses may be performed to separately calculate plural pieces of information for the sheet member P.

As described above, in the sheet member information acquiring device of this embodiment, the load-applying member that comes into contact with the sheet member while applying a load to the sheet member receives a rotation force from the sheet member during conveyance. The protrusion rubs the sheet member and is displaced while applying the load to the sheet member accordingly. Hence, information of the displacement is acquired.

With this embodiment, there is provided the sheet member information acquiring device capable of acquiring the sheet member information containing at least the characteristic information of the mechanical characteristic and the surface irregularity, and the anisotropy of the characteristic information, for properly controlling the sheet member processing apparatus.

Second Embodiment

A sheet member information acquiring device according to a second exemplary embodiment of the present invention is described. This embodiment provides an example of measuring a rotation shift of the load-applying member using an optically measuring unit.

Figure 3:
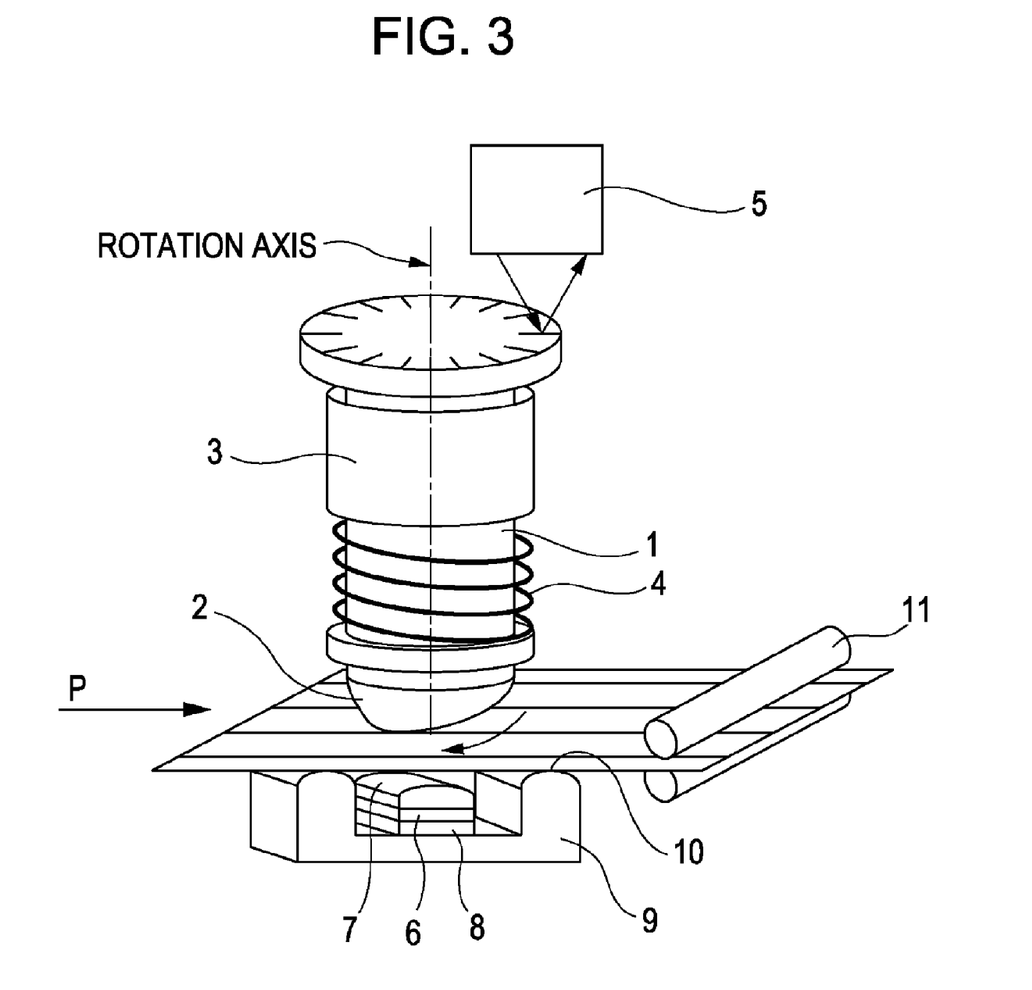
FIG. 3 is an illustration showing a configuration of a sheet member information acquiring device according to another embodiment of the present invention.

FIG. 3 shows a configuration of this embodiment. In this embodiment, a mechanism configured to optically measure the movement of an object is used as a detecting portion 5. The mechanism determines a displacement speed in the horizontal or vertical direction using light emitted on the object and its reflected light, and thus, the mechanism may be a laser displacement meter. Also, a load-applying member 1 has markers utilized for the measurement. Using the mechanism, a rotation angle of the load-applying member 1 per predetermined period of time is measured in this embodiment. At the same time, a displacement (including vibration) of the load-applying member 1 in the vertical direction is measured. Other basic structure is similar to that of the first embodiment.

The overview of an operation of the sheet member information acquiring device according to this embodiment is described. The rotation angle of the load-applying member 1 to be detected is determined on the basis of a force of interaction with the sheet member P. In particular, when the force of interaction between the sheet member P and the protrusion 2 is large, the load-applying member 1 rotates without slipping, and hence, the rotation angle becomes large. In contrast, when the force of interaction is small, the rotation angle becomes small. The force of interaction is determined in accordance with characteristics relating to the surface condition of the sheet member P (for example, the irregularity, friction coefficient, and absorbed component such as water of the sheet member). Accordingly, the sheet member information can be detected using the rotation angle. In addition, the mechanical characteristic of the sheet member can be detected in a manner similar to that of the first embodiment by detecting a displacement of the load-applying member 1 even though the detecting portion 5 in this embodiment is different from that of the first embodiment.

With this embodiment, there is provided the sheet member information acquiring device capable of acquiring the sheet member information containing at least characteristic information on the mechanical characteristic and the surface irregularity, and the anisotropy of the characteristic information, for properly controlling the sheet member processing apparatus.

In particular, information relating to the surface condition of the sheet member, for example, the irregularity, friction coefficient, and absorbed component such as water, can be efficiently acquired.

Third Embodiment

Figure 5:
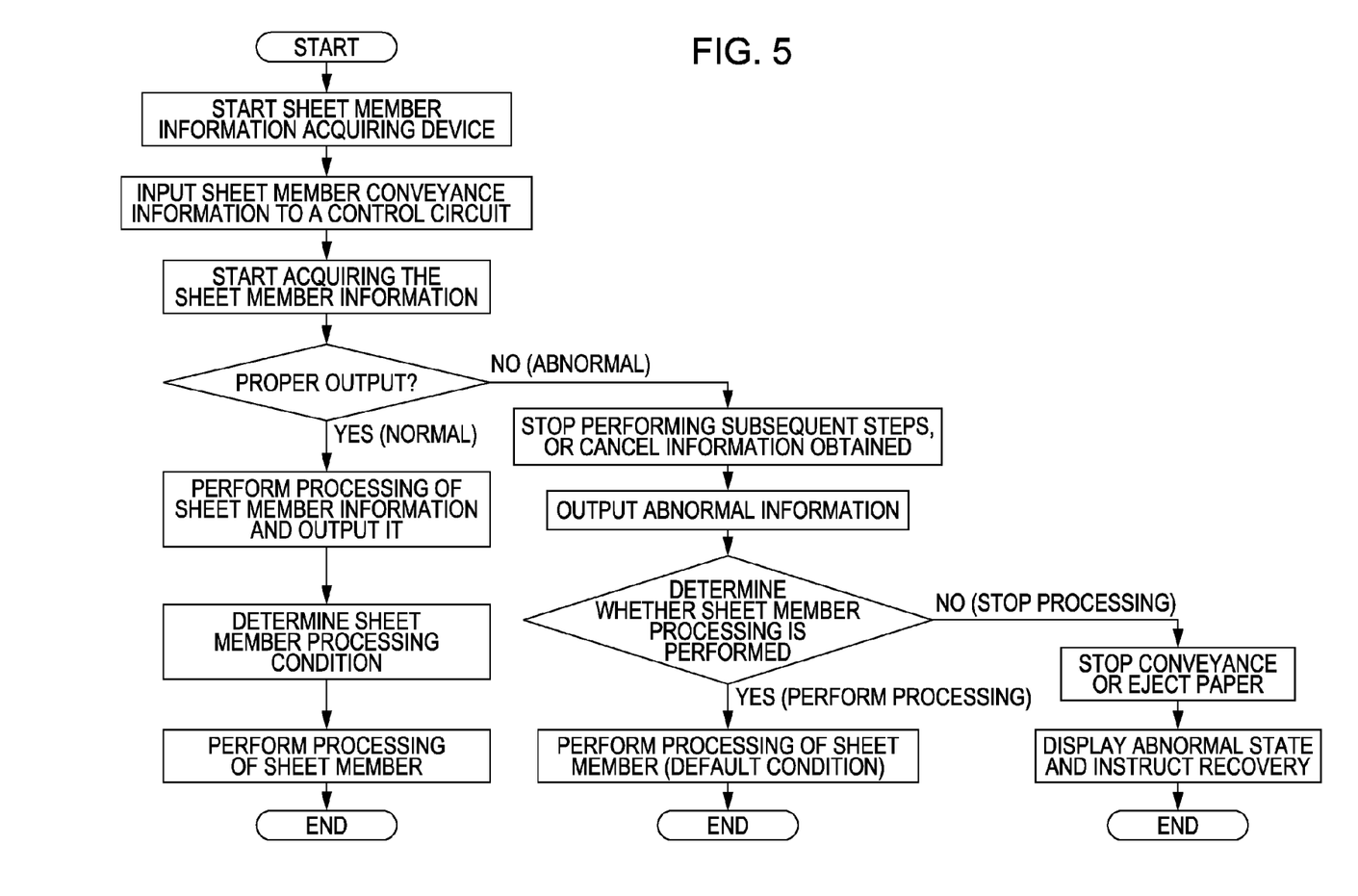
FIG. 5 is a flowchart showing an example operation of a sheet member processing apparatus according to an embodiment of the present invention.

A sheet member processing apparatus according to a third exemplary embodiment of the present invention is described. FIG. 5 shows a procedure for an operation of the sheet member processing apparatus according to this embodiment.

First, a sheet member processing operation is started, to start conveying the sheet member. The sheet member processing operation can be started by a user (operator) of the sheet member processing apparatus, for example, by pressing a start button of an apparatus body, or by sending a processing command from a peripheral device, such as an external computer or a camera connected to the apparatus.

Then, the operation of the sheet member information acquiring device is started. The device can be started in response to the start of the operation of the sheet member processing in the sheet member processing apparatus, on which the sheet member information acquiring device of this embodiment is mounted.

Then, sheet member conveyance information is input to a control circuit of the sheet member information acquiring device. The sheet member conveyance information relates to the position and speed of the sheet member. In particular, the conveyance information represents a timing at which the sheet member passes the position of the sheet member information acquiring device. The timing of driving the sheet member information acquiring device (for example, load application) is determined in accordance with the conveyance information. For example, the sheet member conveyance information may be information obtained by processing a signal provided by a sensor for detecting the passage of the sheet member in the sheet member processing apparatus, and by processing information relating to the start of the operation of the sheet member processing apparatus.

Then, upon the reception of the sheet member conveyance information, the operation for acquiring the sheet member information is started.

After the operation for acquiring the sheet member information is started, the subsequent procedure may vary depending on whether or not the output from the detecting portion is proper.

The case where the output is not proper (NO) is described. For example, the output being not proper means a case where an output of a predetermined range is not provided within a predetermined period of time after the operation is started. In this case, the subsequent steps are not performed, or the obtained information is canceled. Also, abnormal information representing that the sheet member information acquiring device is in abnormal state is output.

If the abnormal state is permissively minor, the sheet member processing does not have to be stopped. For example, the operation of the sheet member information acquiring device is stopped, and then the sheet member processing may be performed under a default condition. The abnormal state can be determined to be minor when it is recognized that the sheet member is normally conveyed, or that an abnormality occurs infrequently and unexpectedly while the sheet member processing is repeated. In contrast, if the influence of the abnormality seems to be serious, the sheet member processing is stopped. When the sheet member processing is being stopped, the conveyance of the sheet member is stopped, or the sheet member is ejected, and the abnormal state of the sheet member processing apparatus is displayed as well as recovery of the processing is instructed. The influence of the abnormal state on the next sheet member processing is determined if required, and proper processing is performed. Then, the operation is terminated.

Next, the case where the output is proper (YES) is described. The sheet member information is acquired with the sheet member information acquiring device of the embodiment of the present invention. Then, the sheet processing condition is determined on the basis of the sheet member information. Then, the sheet member processing such as image formation is performed under the determined sheet member processing condition. With the sheet member processing apparatus according to this embodiment, the processing procedure is determined on the basis of the sheet member information, and the desired controls are performed in the processing steps. The most important control in the sheet member processing apparatus of this embodiment is the control relating to the conveyance of the sheet member. For example, the load of the conveying rollers is set to a large value for a sheet member having a large stiffness. Also, the speed dependency of the mechanical characteristic of the sheet member is reflected on the determination for the proper load-applying speed. Then, the operation is terminated.

With the sheet member processing apparatus of this embodiment, there is provided the sheet member processing apparatus capable of properly controlling the processing steps on the basis of the sheet member information that contains the information of multiple directions including a direction orthogonal to the surface of the sheet member.

While the present invention has been described with reference to exemplary embodiments, it is to be understood that the invention is not limited to the disclosed exemplary embodiments, but to encompass all modifications, equivalent structures and functions.

This application claims the benefit of Japanese Application No. 2006-343053 filed Dec. 20, 2006, which is hereby incorporated by reference herein in its entirety.

What is claimed is:

1. A sheet member information acquiring device configured to acquire information about a sheet member and output the information, the device comprising:
   a load-applying member configured to apply a load to the sheet member;
   a rotation bearing configured to hold the load-applying member rotatably around at least a rotation axis;
   wherein said load-applying member has a protrusion provided at an end portion of said load-applying member subjected to contact with the sheet member, the protrusion being located at a position offset by a predetermined distance from the rotation axis;
   a changing portion configured to change relative positions of the sheet member and said load-applying member while in a contact state; and
   a detecting portion configured to detect a displacement of said load-applying member,
   wherein the detecting portion comprises at least one of an acceleration sensor, a pressure sensitive element and a displacement measuring unit, and
   wherein the sheet member information acquiring device acquires the information about the sheet member on the basis of information provided by the detecting portion.

2. A sheet member information acquiring device according to claim 1, wherein said detecting portion measures optically and said load-applying member contains markers utilized for the optical measurement.

3. A sheet member information acquiring device according to claim 1, wherein said changing portion comprises a pair of rubber rollers.

4. A sheet member information acquiring device according to claim 1, further comprising a receiving member opposing the protrusion of said load-applying member with the sheet member interposed therebetween.

5. A sheet member information acquiring device according to claim 1, wherein said receiving member has a stepped structure.

6. A sheet member processing apparatus comprising:
- a sheet member information acquiring device configured to acquire information about a sheet member and output the information; the sheet member information acquiring device comprising:
- a load-applying member configured to apply a load to the sheet member;
- a rotation bearing configured to hold the load-applying member rotatably around at least a rotation axis;
- wherein said load-applying member has a protrusion provided at an end portion of said load-applying member subjected to contact with the sheet member, the protrusion being located at a position offset by a predetermined distance from the rotation axis;
- a changing portion configured to change relative positions of the sheet member and said load-applying member while in a contact state; and
- a detecting portion configured to detect a displacement of said load-applying member,
- wherein the detecting portion comprises at least one of an acceleration sensor, a pressure sensitive element and a displacement measuring unit,
- wherein the sheet member information acquiring device acquires the information about the sheet member on the basis of information provided by the detecting portion, and
- wherein the sheet member processing apparatus determines a sheet member processing condition on the basis of the sheet member information provided by the sheet member information acquiring device.

* * * * *